(12) United States Patent
Taquet et al.

(10) Patent No.: US 12,165,370 B2
(45) Date of Patent: Dec. 10, 2024

(54) CONTEXT DETERMINATION FOR PLANAR MODE IN OCTREE-BASED POINT CLOUD CODING

(71) Applicant: BlackBerry Limited, Waterloo (CA)

(72) Inventors: Jonathan Taquet, Talensac (FR); Sébastien Lasserre, Thorigné-fouillard (FR)

(73) Assignee: BlackBerry Limited, Waterloo (CA)

( * ) Notice: Subject to any disclaimer, the term of this patent is extended or adjusted under 35 U.S.C. 154(b) by 363 days.

(21) Appl. No.: 17/784,388

(22) PCT Filed: Jan. 7, 2020

(86) PCT No.: PCT/IB2020/000226
§ 371 (c)(1),
(2) Date: Jun. 10, 2022

(87) PCT Pub. No.: WO2021/140354
PCT Pub. Date: Jul. 15, 2021

(65) Prior Publication Data
US 2023/0048381 A1 Feb. 16, 2023

(51) Int. Cl.
*G06T 9/40* (2006.01)
(52) U.S. Cl.
CPC .................... *G06T 9/40* (2013.01)
(58) Field of Classification Search
None
See application file for complete search history.

(56) References Cited

U.S. PATENT DOCUMENTS

| | | | |
|---|---|---|---|
| 2017/0214943 A1* | 7/2017 | Cohen | H04N 19/62 |
| 2017/0347122 A1* | 11/2017 | Chou | G06T 9/00 |
| 2021/0209806 A1* | 7/2021 | Oh | G06T 19/00 |

OTHER PUBLICATIONS

Taquet J et al: "Planar mode buffer optimization", ISO/IEC JTC1/SC29/WG11 MPEG/m52345 Jan. 2020, Brussels, BE.
G-PCC codec description v5; ISO/IEC/ JTC1/SC29/WG 11 N18891, Oct. 2019, Geneva, CH.
Sebastien Lasserre et al: "Planar mode in octree-based geometry coding", m48906, Jul. 3, 2019 (Jul. 3, 2019).
Matthias Niessner et al: "Real-time 3D Reconstruction at Scale using Voxel Hashing", ACM Transactions on Graphics, ACM, NY, US, vol. 32, No. 6, Nov. 1, 2013, pp. 1-11.

(Continued)

*Primary Examiner* — Vikkram Bali
(74) *Attorney, Agent, or Firm* — Rowand LLP

(57) ABSTRACT

A method of encoding point cloud data using a planar coding mode is disclosed. The planar coding mode may be signaled using a planar mode flag to signal that a current volume is planar. A volume is planar if all of its occupied child nodes are on one side of a plane bisecting the volume. A planar position flag may signal which side of the volume is occupied. Volume data for already-coded occupied volumes of the point cloud is tracked using a data structure stored in memory. Entropy coding may be used to code the planar mode flag and/or the planar position flag. Context determination for coding may take into account a distance between the volume and a closest already-coded occupied volume among those tracked already-coded occupied volumes that have a same index in the data structure as the current volume.

24 Claims, 12 Drawing Sheets

(56) References Cited

OTHER PUBLICATIONS

Marius Muja et al: "Scalable Nearest Neighbor Algorithms for High Dimensional Data", IEEE Transactions on Pattern Alalysis and Machine Intelligence, IEEE Computer Society, USA, vol. 36, No. 11, Nov. 1, 2014 (Nov. 1, 2014), pp. 2227-2240.

Mayur Datar et al: "Locality-Sensitive Hashing Scheme Based on p-Stable Distributions", Computational Geometry, ACM, 2 Penn Plaza, Suite 701 New York NY 10121-0701 USA, Jun. 8, 2004 (Jun. 8, 2004), pp. 253-262.

PCT International Search Report and Written Opinion relating to PCT Application No. PCT/IB2020/000226 dated Sep. 17, 2020.

* cited by examiner

CONTEXT DETERMINATION FOR PLANAR MODE IN OCTREE-BASED POINT CLOUD CODING

FIELD

The present application generally relates to point cloud compression and, in particular to methods and devices for improved compression of occupancy data in octree-based coding of point clouds.

BACKGROUND

Data compression is used in communications and computer networking to store, transmit, and reproduce information efficiently. There is an increasing interest in representations of three-dimensional objects or spaces, which can involve large datasets and for which efficient and effective compression would be highly useful and valued. In some cases, three-dimensional objects or spaces may be represented using a point cloud, which is a set of points each having a three-coordinate location (X, Y, Z) and, in some cases, other attributes like color data (e.g. luminance and chrominance), transparency, reflectance, normal vector, etc. Point clouds can be static (a stationary object or a snapshot of an environment/object at a single point in time) or dynamic (a time-ordered sequence of point clouds).

Example applications for point clouds include topography and mapping applications. Autonomous vehicle and other machine-vision applications may rely on point cloud sensor data in the form of three-dimensional scans of an environment, such as from a LiDAR scanner. Virtual reality simulations may rely on point clouds.

It will be appreciated that point clouds can involve large quantities of data and compressing (encoding and decoding) that data quickly and accurately is of significant interest. Accordingly, it would be advantageous to provide for methods and devices that more efficiently and/or effectively compress data for point clouds. Such methods may result in savings in storage requirements (memory) through improved compression, or savings in bandwidth for transmission of compressed data, thereby resulting in improved operation of 3D vision systems, such as for automotive applications, or improved speed of operation and rendering of virtual reality systems, as examples.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
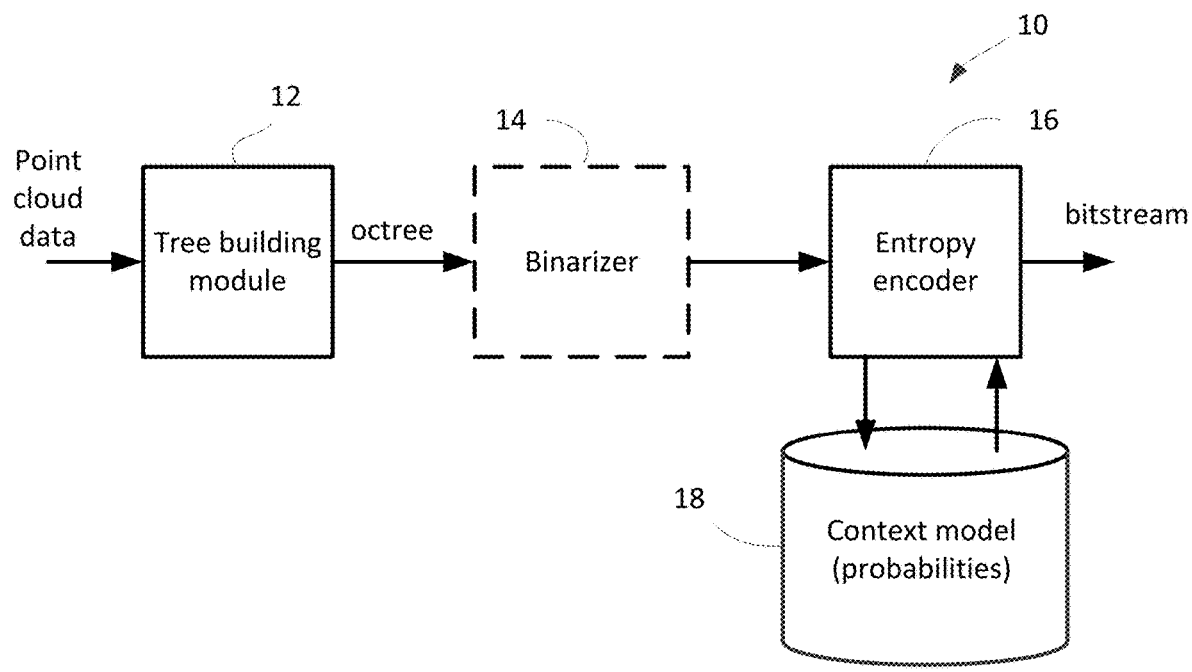
FIG. 1 shows a simplified block diagram of an example point cloud encoder.

The present application describes methods of encoding and decoding point clouds, and encoders and decoders for encoding and decoding point clouds.

Some of the described embodiments in the present application may be implemented in the same manner in an encoder and in a corresponding decoder such that they are both performing the same operation to have a properly decodable bitstream. Accordingly, in the following description, the phrase "already/previously-coded (occupied) node/volume" may refer to an "already/previously encoded (occupied) node/volume" when in the context of an encoder and to an "already/previously decoded (occupied) node/volume" when in the context of a decoder.

In one aspect, the present application describes a method of encoding a point cloud. According to the method, a bitstream of compressed point cloud data representing a three-dimensional location of an object is generated, the point cloud being located within a volumetric space that is recursively split into sub-volumes and which contains points of the point cloud. A volume is partitioned into a first set of child sub-volumes and a second set of child sub-volumes, the first set of child sub-volumes being positioned in a first plane and the second set of child sub-volumes being positioned in a second plane parallel to the first plane. An occupancy bit associated with each respective child sub-volume indicates whether that respective child sub-volume contains at least one of the points, both the first plane and the second plane being orthogonal to an axis. The method includes: determining whether the current volume is planar based on whether all child sub-volumes containing at least one point are positioned in either the first set or the second set; tracking already-coded occupied volume data for one or more positions on the axis, wherein the tracking includes storing, in a data structure, volume data for at least one already-coded occupied volume, wherein one or both of an index in the data structure and representative position data for the at least one already-coded occupied volume is obtained based on applying a hash function to coordinates data for said at least one already-coded occupied volume; obtaining an index in the data structure for the current volume based on applying the hash function to coordinates data for the current volume; entropy encoding in the bitstream a planar mode flag to signal whether the current volume is planar, wherein the entropy encoding includes determining a context for coding the planar mode flag based on a distance between the current volume and a closest already-coded occupied volume among those tracked already-coded occupied volumes that have a same index in the data structure as the current volume; encoding occupancy bits for at least some of the child sub-volumes; and outputting the bitstream of compressed point cloud data.

In another aspect, the present application describes a method of decoding a bitstream of compressed point cloud data to produce a reconstructed point cloud representing a three-dimensional location of a physical object. The point cloud is located within a volumetric space that is recursively split into sub-volumes and which contains points of the point cloud. A volume is partitioned into a first set of child sub-volumes and a second set of child sub-volumes, the first set of child sub-volumes being positioned in a first plane and the second set of child sub-volumes being positioned in a second plane parallel to the first plane. An occupancy bit associated with each respective child sub-volume indicates whether that respective child sub-volume contains at least one of the points, both the first plane and the second plane being orthogonal to an axis. The method includes: tracking already-coded occupied volume data for one or more positions on the axis, wherein the tracking includes storing, in a data structure, volume data for at least one already-coded occupied volume, wherein one or both of an index in the data structure and representative position data for the at least one already-coded occupied volume is obtained based on applying a hash function to coordinates data for said at least one already-coded occupied volume; reconstructing the points of the point cloud by reconstructing the occupancy bits by: obtaining an index in the data structure for the current volume based on applying the hash function to coordinates data for the current volume; entropy decoding from the bitstream a planar mode flag that indicates whether the current volume is planar, wherein the current volume is planar if all child sub-volumes containing at least one point are positioned in either the first set or the second set, wherein entropy decoding includes determining a context for coding the planar mode flag based on a distance between the current volume and a closest already-coded occupied volume among those tracked already-coded occupied volumes that have a same index in the data structure as the current volume; and reconstructing occupancy bits for the child sub-volumes.

In some implementations, the data structure may comprise a two-dimensional array, each array element of the array being associated with a respective already-coded occupied volume, wherein each row of the array may contain array elements corresponding to tracked volumes that have a same index in the data structure.

In some implementations, a row index of an already-coded occupied volume in the array may be obtained based on applying a hash function to a coordinate representing a position of the already-coded occupied volume on the axis.

In some implementations, the closest already-coded occupied volume may be identified based on determining distances between the current volume and each of the tracked already-coded occupied volumes having the same index in the data structure as the current volume.

In some implementations, the distances may be determined using coordinates in a plane orthogonal to the axis.

In some implementations, the stored volume data for the at least one already-coded occupied volume may comprise hashes of coordinates representing a position of the at least one already-coded occupied volume in a plane orthogonal to the axis.

In some implementations, the stored volume data for the at least one already-coded occupied volume may include one or more of a planar mode flag associated with the at least one already-coded occupied volume or a position of the at least one already-coded occupied volume on the axis.

In some implementations, the disclosed methods may further comprise updating already-coded occupied volume data for the tracked volumes having the same index in the data structure as the current volume.

In some implementations, the updating may include discarding stored volume data for one of the tracked volumes having the same index as the current volume from the data structure and adding volume data for the current volume to the data structure.

In some implementations, the updating may include: obtaining representative position data for the current volume, wherein one or both of the index in the data structure and the representative position data for the current volume is obtained based on applying a hash function to coordinates data for the current volume; and storing, at the obtained index in the data structure, volume data for the current volume, the volume data including the representative position data for the current volume.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

In yet another aspect, the present application describes a computer-readable signal containing program instructions which, when executed by a computer, cause the computer to perform the described methods of encoding and/or decoding.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

In the description below, the terms "node", "volume" and "sub-volume" may be used interchangeably. It will be appreciated that a node may be associated with a volume or a sub-volume. A node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data. The tree-like structure of partitioning of volumes into sub-volumes may be referred to as a "parent" and "child" relationship, where the sub-volumes are child nodes or child sub-volumes to the parent node or parent volume. Sub-volumes within the same volume may be referred to as sibling nodes or sibling sub-volumes.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as colour, which may also be a three-component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-colored, highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment. A particular challenge in coding point clouds that does not arise in the case of other data compression, like audio or video, is the coding of the geometry of the point cloud. Point clouds tend to be sparsely populated, which makes efficiently coding the location of the points that much more challenging.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

A commonly-used tree structure is an octree. In this structure, the volumes/sub-volumes are all cubes and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. The partitioning of a volume is not necessarily into two sub-volumes (KD-tree) or eight sub-volumes (octree), but could involve other partitions, including division into non-rectangular shapes or involving non-adjacent sub-volumes.

The present application may refer to octrees for ease of explanation and because they are a popular candidate tree structure for automotive applications, but it will be understood that the methods and devices described herein may be implemented using other tree structures.

Reference is now made to FIG. 1, which shows a simplified block diagram of a point cloud encoder 10 in accordance with aspects of the present application. The point cloud encoder 10 includes a tree building module 12 for receiving point cloud data and producing a tree (in this example, an octree) representing the geometry of the volumetric space containing the point cloud and indicating the location or position of points from the point cloud in that geometry.

In the case of a uniformly partitioned tree structure, like an octree, each node may be represented by a sequence of occupancy bits, where each occupancy bit corresponds to one of the sub-volumes in the node and signals whether that sub-volume contains at least one point or not. Occupied sub-volumes are recursively split, up to a maximum depth of the tree. This may be termed the serialization or binarization of the tree. As shown in FIG. 1, in this example, the point cloud encoder 10 includes a binarizer 14 for binarizing the octree to produce a bitstream of binarized data representing the tree.

This sequence of bits may then be encoded using an entropy encoder 16 to produce a compressed bitstream. The entropy encoder 16 may encode the sequence of bits using a context model 18 that specifies probabilities for coding bits based on a context determination by the entropy encoder 16. The context model 18 may be adaptively updated after coding of each bit or defined set of bits. The entropy encoder 16 may, in some cases, be a binary arithmetic encoder. The binary arithmetic encoder may, in some implementations, employ context-adaptive binary arithmetic coding (CABAC). In some implementations, coders other than arithmetic coders may be used.

In some cases, the entropy encoder 16 may not be a binary coder, but instead may operate on non-binary data. The output octree data from the tree building module 12 may not be evaluated in binary form but instead may be encoded as non-binary data. For example, in the case of an octree, the eight flags within a sub-volume (e.g. occupancy flags) in their scan order may be considered a $2^8-1$ bit number (e.g. an integer having a value between 1 and 255, since the value 0 is not possible for a split sub-volume, i.e. it would not have been split if it was entirely unoccupied). This number may be encoded by the entropy encoder using a multi-symbol arithmetic coder in some implementations. Within a sub-volume, e.g. a cube, the sequence of flags that defines this integer may be termed a "pattern".

A convention that is typically used in point cloud compression is that an occupancy bit value of 1 signals that the associated node or volume is "occupied", i.e. that it contains at least one point, and an occupancy bit value of 0 signals that the associated node or volume is "unoccupied", i.e. that it contains no points. More generally, an occupancy bit may have a value indicating occupied or a value indicating unoccupied. In the description below for ease of explanation, example embodiments may be described in which the convention of 1=occupied and 0=unoccupied is used; however, it will be understood that the present application is not limited to this convention.

Figure 2:
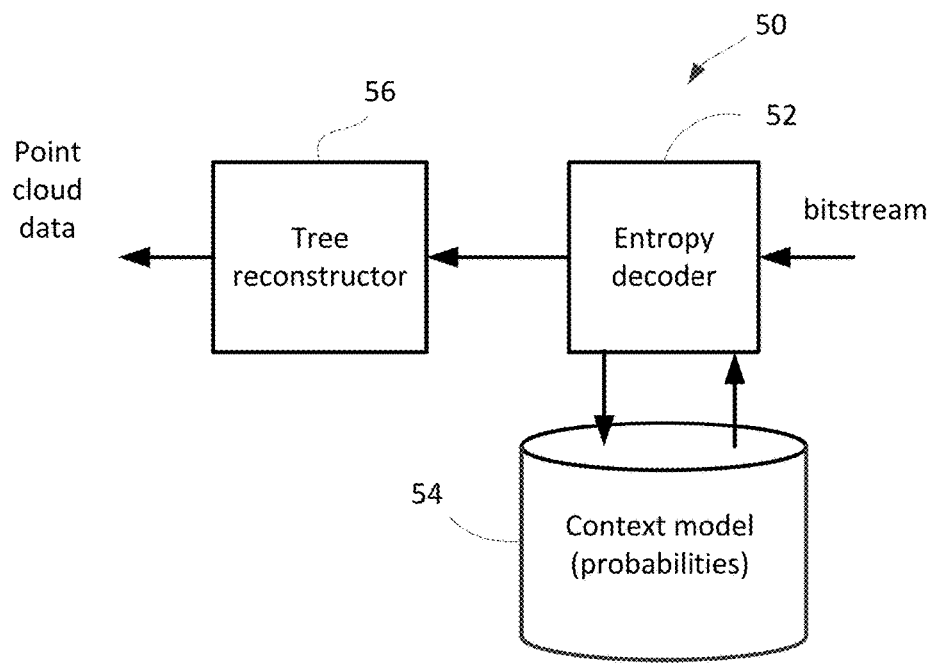
FIG. 2 shows a simplified block diagram of an example point cloud decoder.

A block diagram of an example point cloud decoder 50 that corresponds to the encoder 10 is shown in FIG. 2. The point cloud decoder 50 includes an entropy decoder 52 using the same context model 54 used by the encoder 10. The entropy decoder 52 receives the input bitstream of compressed data and entropy decodes the data to produce an output sequence of decompressed bits. The sequence is then converted into reconstructed point cloud data by a tree reconstructor 56. The tree reconstructor 56 rebuilds the tree structure from the decompressed data and knowledge of the scanning order in which the tree data was binarized. The tree reconstructor 56 is thus able to reconstruct the location of the points from the point cloud (subject to the resolution of the tree coding).

In European patent application no. 18305037.6, the applicants described methods and devices for selecting among available pattern distributions to be used in coding a particular node's pattern of occupancy based on some occupancy information from previously-coded nodes near the particular node. In one example implementation, the occupancy information is obtained from the pattern of occupancy of the parent to the particular node. In another example implementation, the occupancy information is obtained from one or more nodes neighboring the particular node. The contents of European patent application no. 18305037.6 are incorporated herein by reference. This is referred to as determining a "neighbor configuration", and selecting a context (i.e. a pattern distribution) at least partly based on the neighbor configuration.

In European patent application no. 18305415.4, the applicants described methods and devices for binary entropy coding occupancy patterns. The contents of European patent application no. 18305415.4 are incorporated herein by reference.

Certain types of point cloud data tend to have strong directionality. Non-natural environments in particular exhibit strong directionality, as those environments tend to feature uniform surfaces. For example, in the case of LiDAR, the roadway and the walls of adjacent buildings are generally horizontally or vertically planar. In the case of interior scans within rooms, the floor, ceiling and walls are all planar. LiDAR for the purpose of automotive vision and similar applications tends to be lower resolution and also needs to be compressed quickly and efficiently.

Octrees are efficient tree structures because they are based around a uniform partitioning process of equal division of a cube into eight sub-cubes using three orthogonal planes in every case, so signaling their structure is efficient. However, octrees using current signaling processes are not able to exploit the efficiencies available from recognizing the planar nature of some non-natural environments. KD-trees, however, are able to better tailor the partitioning to the directionality of the point cloud. This makes them a more efficient and effective structure for these types of environments. A downside to KD-trees is that the signaling of their structure requires significantly more data than octrees. The fact that KD-trees are non-uniform means that some of the techniques used to improve octree compression are unavailable to KD-trees or would be computationally difficult to implement.

Accordingly, it would be advantageous to have a mechanism for representing non-natural environments using a uniform partitioning-based tree structure in a manner that improves compression by exploiting horizontal and/or vertical directionality.

In accordance with embodiments of the present application, improved point cloud compression processes and devices feature a planar coding mode. The planar mode is signaled to indicate that a volume meets certain requirements for planarity in terms of its occupancy. In particular, a volume is planar if all of its occupied sub-volumes are positioned or located in a common plane. The syntax for signaling may indicate whether a volume is planar and, if so, the position of the common plane. Through exploiting this knowledge of planarity, gains in compression may be achieved. Applying criteria for eligibility to enable the planar mode and mechanisms for context-adaptive coding of the planar mode signaling may help improve compression performance.

In the description below, planarity is presumed to be with respect to a Cartesian axis aligned with the structure of the volumes and sub-volumes. That is, a volume is planar if all of its occupied sub-volumes are positioned in a common plane orthogonal to one of the axes. As a convention, the axes will presume that the z-axis is vertical, meaning that the (horizontal) plane is orthogonal to the z-axis. In some of the examples below, horizontal planarity will be used to illustrate concepts; however, it will be appreciated that the present application is not limited to horizontal planarity and may alternatively or additionally include vertical planarity with respect to the x-axis, the y-axis, or both the x- and y-axes. Moreover, in some examples, planarity may not necessarily be aligned by orthogonality with the Cartesian axes. To illustrate, in one example, a diagonal vertical planarity may be defined that is at a 45-degree angle with both the x- and y-axes.

Figure 3:
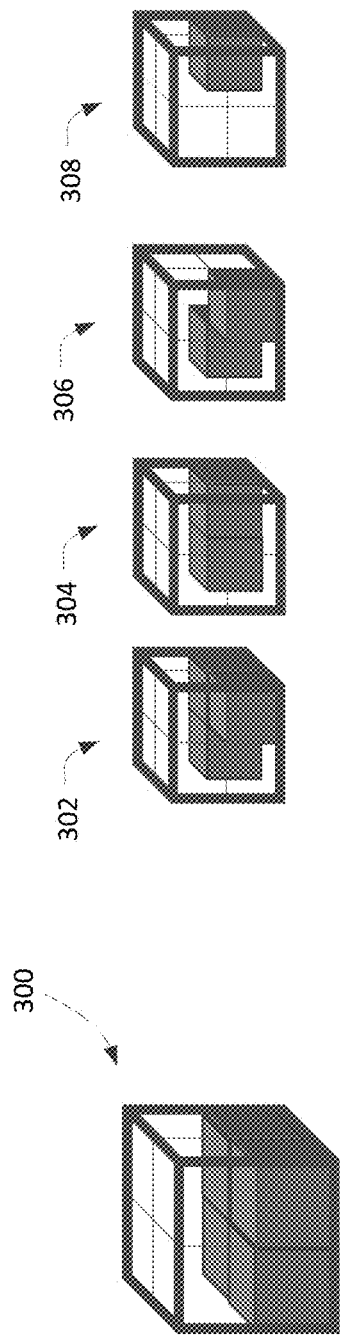
FIGS. 3 and 4 illustrate examples of a volume exhibiting planarity in its occupied child sub-volumes.
Figure 4:
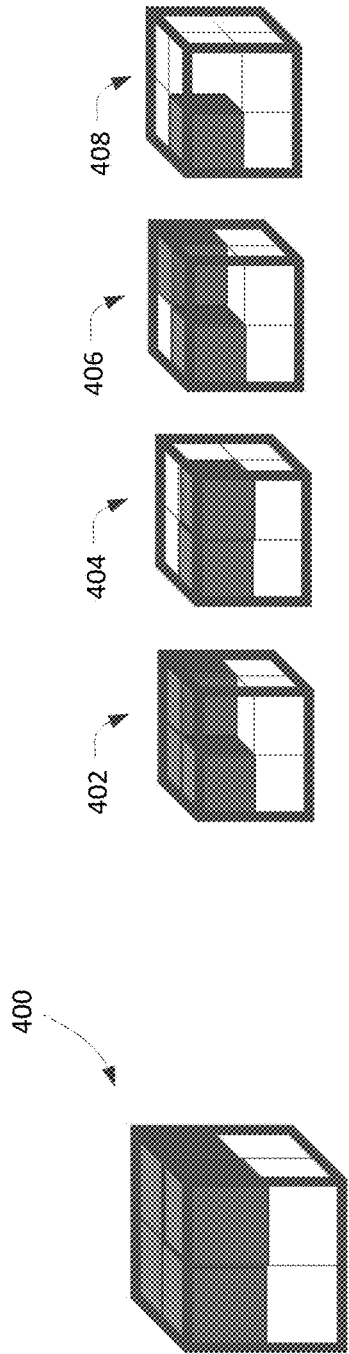

Reference is now made to FIGS. 3 and 4, each of which show example volumes 300 and 400. In this example, horizontal planarity will be illustrated and discussed, but those ordinarily skilled in the art will appreciate the extension of the concepts to vertical or other planarity.

Volume 300 is shown partitioned into eight sub-volumes. Occupied sub-volumes are indicated using shading, whereas unoccupied sub-volumes are shown empty. It will be noted that the lower (in a z-axis or vertical sense) four sub-volumes in the volume 300 are occupied. This pattern of occupancy is horizontally planar; that is, each of the occupied sub-volumes is in the same horizontal plane, i.e. has the same z-position. Volume 400 shows another example of a horizontally planar pattern of occupancy. All of the occupied sub-volumes of volume 400 are in the same horizontal plane. Volume 300 shows a case in which the lower plane is occupied, and volume 400 shows a case in which the upper plane is occupied. This may be termed the "plane position", where the plane position signals where the planar sub-volumes are within the volume. In this case, it is a binary 'upper' or 'lower' signal.

Planarity of a volume is not limited to the case in which all sub-volumes of a plane, e.g. all sub-volumes of the upper half of a 2×2×2 volume, are occupied. In some cases, only some of the sub-volumes in that plane are occupied, provided there are no occupied sub-volumes outside of that plane. In fact, as few as one occupied sub-volume may be considered "planar". Volumes 302, 304, 306, 308, 402, 404, 406, and 408 each illustrate examples of horizontally planar occupancy. Note with respect to volumes 308 and 408 that they meet the requirements for being horizontally planar since in each case the upper or lower half of the volume 308 and 408 is empty, i.e. all occupied sub-volumes (in these examples, one sub-volume) are located in one horizontal half of the volume 308 and 408. It will also be appreciated that in these examples, a volume with a single occupied sub-volume would also meet the requirements for vertical planarity with respect to the y-axis and vertical planarity with respect to the x-axis. That is, the volumes 308 and 408 are planar in three directions.

Planarity may be signaled with respect to a volume through a planar mode flag, e.g. isPlanar. In the case where there are multiple planar modes possible, e.g. with respect to the z-axis, y-axis, and x-axis, there may be multiple flags: isZPlanar, isYPlanar, isXPlanar. In this example, for ease of illustration, it is presumed that only horizontal planar mode is enabled.

The planar mode flag indicates whether a volume is planar or not. If it is planar, then a second syntax element, a plane position flag, planePosition, may be used to signal the position of the plane within the volume. In this example, the planePosition flag signals whether the planar occupied sub-volumes are in the upper half or lower half of the volume.

In a more complex implementation involving non-orthogonal planes, e.g. planes that are diagonal with respect to one or more of the axes, a more complex signaling syntax may be used involving multiple flags or a non-binary syntax element.

The planar mode flag and/or the plane position flag may be encoded in the bitstream using any suitable coding scheme. The flags may be entropy encoded in some implementations using prediction and/or context-adaptive coding to improve compression. Example techniques for determining context for coding the flags are discussed further below.

Occupancy Coding and Planar Mode

By signaling planarity, the coding of occupancy bits may be altered, since the planarity information allows for inferences to be made about the occupancy pattern that shortcut the signaling of occupancy. For example, if a volume is planar, then the four sub-volumes not pointed at by the plane position flag may be presumed empty and their occupancy bits need not be coded. Only the up-to-four bits of the occupied plane need be coded. Moreover, if the first three coded bits of that plane are zero (unoccupied), then the last (fourth) bit in the coding order may be inferred to be one (occupied) since the planar signaling indicated that the plane was occupied. Additionally, if planar signaling indicates that a volume is not planar, then there must be at least one occupied sub-volume in both planes, which allows for additional inferred occupancy of the last bits of either plane if the first three occupancy bits of either plane are zero.

Accordingly, signaling planar mode may provide efficiencies in coding of occupancy data. Nevertheless, planar mode signaling adds syntax elements to the bitstream and may not provide efficiencies in all situations. For example, in a dense point cloud and at certain depths, signaling planarity may not be advantageous since any node with more than five occupied child nodes cannot be planar by definition.

In U.S. patent application Ser. No. 16/456,150, which is commonly owned with the present application, the applicants described various eligibility criteria for enabling planar mode. In one example implementation, the eligibility criteria may be based on a metric such as the mean number of occupied child nodes in a volume. In another example implementation, a running probability factor indicating the likelihood of a node being planar is determined. A threshold eligibility value may be set and planar mode may be enabled for a given volume/node if the then-current probability factor is greater than the threshold. The contents of U.S. patent application Ser. No. 16/456,150 are incorporated herein by reference.

Figure 5:
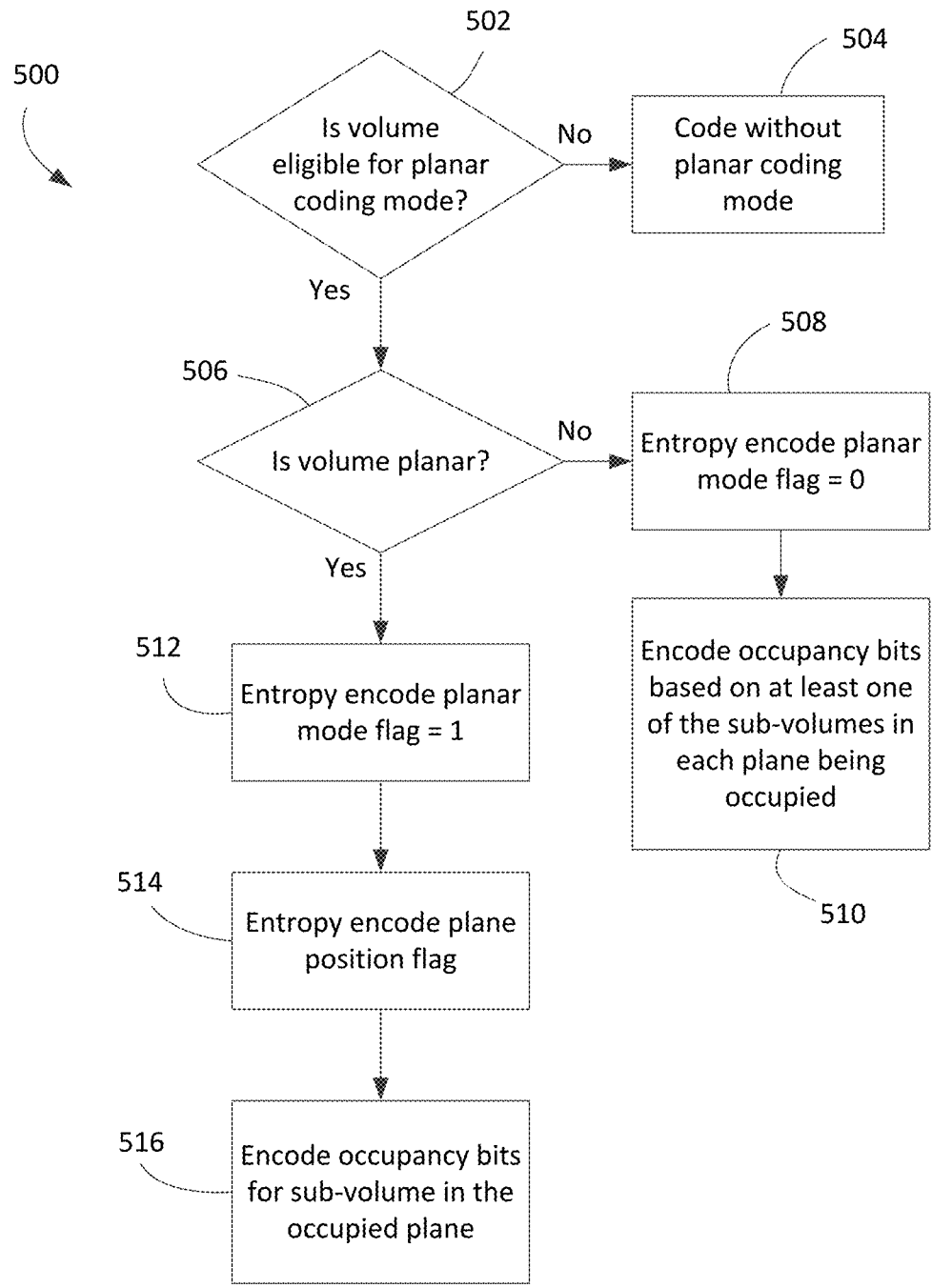
FIG. 5 shows, in flowchart form, one example method of encoding point cloud data using a planar coding mode.

Reference is now made to FIG. 5, which shows, in flowchart form, an example method 500 of encoding point cloud data using a planar mode. The method 500 reflects a process for encoding occupancy information for a volume. In this example, the volume is uniformly partitioned into eight sub-volumes, each having an occupancy bit, in accordance with octree-based coding. For simplicity, the present example assumes only one (e.g. horizontal) planar mode is used.

In operation 502, the encoder assesses whether the volume is eligible for planar coding mode. In one example, eligibility may be based on cloud density, which may be assessed using a mean number of occupied child nodes. To improve local adaptation, eligibility may be based on probability factor tracking. If planar coding mode is not eligible, then the occupancy pattern for the volume is encoded without using planar coding mode, as indicated by operation 504.

If planar mode is enabled, then in operation 506, the encoder assesses whether the volume is planar. If the volume is not planar, then in operation 508 it encodes the planar mode flag, e.g. isPlanar=0. In operation 510, the encoder then encodes the occupancy pattern based on there being at least one occupied sub-volume per plane. That is, the occupancy pattern is encoded and if the first three bits coded for either plane (upper or lower) are zero then the last (fourth) bit for that plane is not coded and is inferred to be one since the corresponding sub-volume must be occupied.

If planar mode is enabled and the volume is planar, then in operation 512 the planar mode flag is encoded, e.g. isPlanar=1. Because the volume is planar, the encoder then also encodes the plane position flag, planePosition. The plane position flag signals whether the planar occupied sub-volumes are in the upper half or lower half of the volume. For example, planePosition=0 may correspond to the lower half (i.e. lower z-axis position) and planePosition=1 may correspond to the upper half. The occupancy bits are then encoded based on knowledge of the planarity of the volume and the position of the occupied sub-volumes. That is, up-to-four bits are encoded since four may be inferred to be zero, and the fourth bit may be inferred to be one if the first three encoded are zero.

Figure 6:
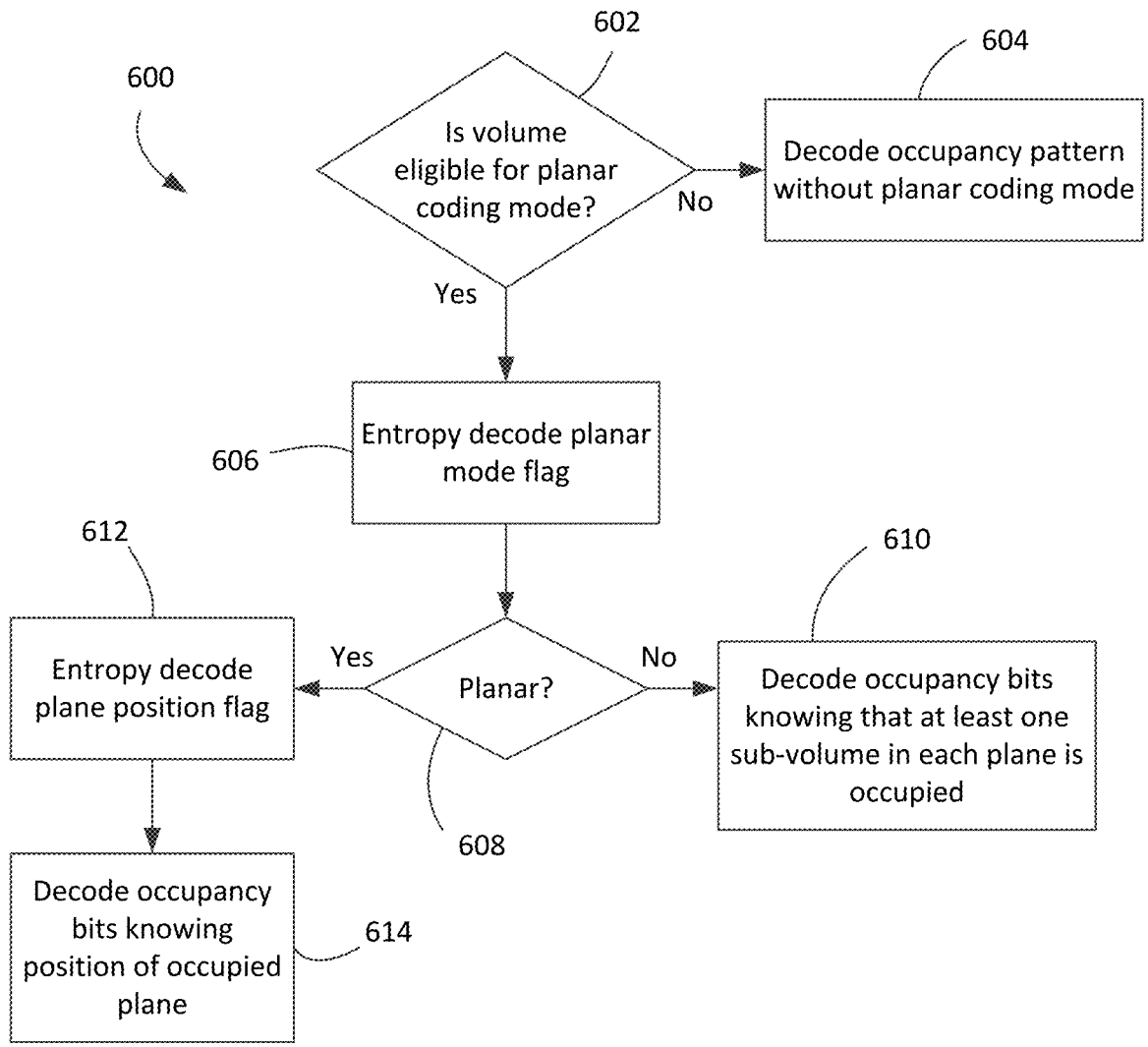
FIG. 6 shows, in flowchart form, one example method of decoding point cloud data using a planar coding mode.

An example method 600 of decoding encoded point cloud data is shown in FIG. 6. The example method 600 is implemented by a decoder that receives a bitstream of encoded data. For a current volume, the decoder determines whether the volume is eligible for planar mode in operation 602. The eligibility assessment is the same assessment as was carried out at the encoder. If not eligible for planar mode, the decoder entropy decodes the occupancy pattern as per usual without using planar mode signaling, as indicated by operation 604.

If planar mode is enabled, then in operation 606 the decoder decodes the planar mode flag. The decoded planar mode flag indicates whether the volume is planar or not, as indicated by operation 608. If not planar, then the decoder decodes occupancy bits knowing at least one sub-volume in each plane is occupied. This may allow the decoder to infer one or two of the occupancy bits depending on the value of the other bits decoded.

If the decoded planar mode flag indicates that the volume is planar, then in operation 612 the decoder decodes a plane position flag. The decoded plane position flag indicates whether the occupied sub-volumes are in the upper half or lower half of the volume. Based on that knowledge, the decoder then infers the value of the four occupancy bits in the unoccupied half as zero and it decodes the up-to-four bits of the occupancy pattern for the occupied half, as shown by operation 614.

Entropy Coding of Planar Mode Syntax

Planar mode syntax, such as the planar mode flag or the plane position flag, may represent a significant portion of the bitstream. Accordingly, to make planar mode effective in compressing point cloud data, it may be advantageous to ensure the planar information is entropy coded with effective context determination.

Recall that whether a node/volume is planar or not is signaled using a planar mode flag, isPlanar. In the present discussion of examples, it will be assumed that the planar mode is applicable for horizontal planarity, i.e. with respect to the z-axis. The flag may be termed isZPlanar in this example. Entropy encoding of the flag may employ a binary arithmetic coder, e.g. a context-adaptive binary arithmetic coder (CABAC). The context (or internal probability) may be determined using one or more predictive factors.

The planar mode flag for a current node or sub-volume signals whether the child sub-volumes within the sub-volume are planar. The current node or sub-volume exists within a parent volume. As examples, the predictive factors for determining context for coding the planar mode flag may include one or more of (a) parent volume planarity; (b) occupancy of adjacent neighboring volume; and (c) distance to closest occupied already-coded node at same depth and at same z-axis position.

Figure 7:
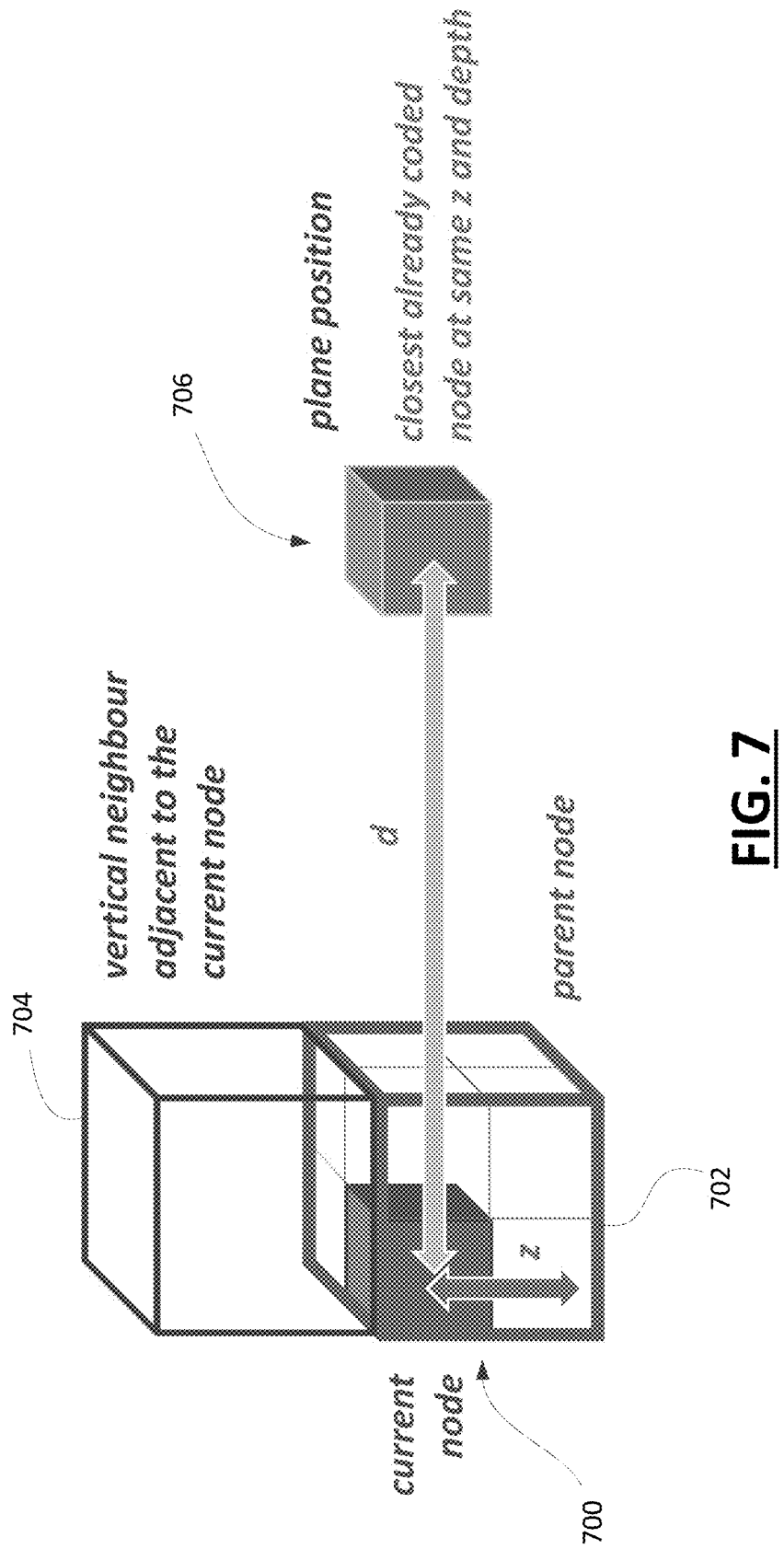
FIG. 7 diagrammatically illustrates possible factors in determining context for coding a planar mode flag or plane position flag.

FIG. 7 illustrates the three example factors with regard to a current node 700 within a parent node 702.

Factor (a) refers to whether the parent node 702 was planar or not. Irrespective of whether it was coded using planar mode, if the parent node 702 meets the criteria for planarity (in this case, horizontal planarity), then the parent node 702 is considered planar. The factor (a) is binary: "parent is planar" or "parent is not planar".

Factor (b) refers to the occupancy status of a neighboring volume 704 at the parent depth adjacent to a face of the parent volume aligned with the plane. In the case of horizontal planarity, the neighboring volume 704 is vertically above the parent node 702 if the current node 700 is in the top half of the parent volume 702. If the current node 700 were in the bottom half of the parent node 702, then the neighboring volume 704 would be vertically below. In the case of vertical planarity, the neighboring volume would be adjacent to one of the sides, depending on x-axis or y-axis planarity and location of the current node. Factor (b) is also binary: the neighbor is either occupied or not occupied.

Factor (c) refers to how far away a closest already-coded node 706 is under conditions that the already-coded node is located at the same depth as the current node 700 and lies in a common plane, i.e. is at the same z-axis position as the current node 700. The already-coded node 706 is not necessarily in an adjacent volume and could be some distance away, depending on the density of the cloud. The coder tracks already-coded nodes and identifies the closest one that meets these criteria. The distance d, between the current node 700 and an already coded node 706, may be determined from relative positions of the nodes 700 and 706. In some embodiments, an L1 norm may be used to determine distance, i.e. absolute value of delta-x plus absolute value of delta-y, for simplicity of calculation. In some embodiments, an L2 norm may be used to determine the distance, i.e. (the square root of) the sum of squares given by delta-x squared plus delta-y squared.

In some implementations, the distance d may be discretized into two values "near" and "far". The division between a "near" d and a "far" d may be suitably selected. By categorizing distance as either near or far, factor (c) is also binary. It will be appreciated that in some implementations, the distance may be discretized into three or more values.

If all three example factors are used in context determination, then 2×2×2=8 separate contexts may be maintained for coding of the planar mode flag.

If the planar mode flag is coded for the current node 700 and the current node 700 is planar, then a plane position flag may be coded, such as planeZPosition. The plane position flag signals which half of current node 700 contains the occupied child sub-volumes. In the case of horizontal planarity, the plane position flag signals either the bottom half or the top half.

Entropy encoding of the plane position flag may also employ a binary arithmetic coder, e.g. CABAC. The context (or internal probability) may be determined using one or more predictive factors, possible examples of which include: (a') occupancy of adjacent neighboring volume 704; (b') distance to closest occupied already-coded node 706 at same depth and at same z-axis position; (c') if the closest occupied already-coded node 706 at the same depth and z-axis position is planar, its plane position; and (d') location of current node 700 within the parent node 702.

Factor (a') is the same as factor (b) discussed above with regard to planar mode flag context. Factor (b') is the same as factor (c) discussed above with regard to planar mode flag context. In some example implementations, factor (b') may discretize the distance into three categories: "near", "not too far", and "far". As discussed above, distance may be determined using an L1 norm, or an L2 norm, or any other suitable measure.

Factor (c') refers to whether the closest occupied already-coded node 706 is planar or not and, if so, whether it is top or bottom planar, i.e. its plane position. It turns out that even a distant already-coded node that is planar may be a strong predictor of planarity or plane position for a current node. That is, factor (c') may have three outcomes: not planar, same plane position as the current node 700, different plane position from current node 700. If the current node 700 and the closest already-coded occupied node 706 have the same plane position, then their occupied child sub-volumes are all aligned in a common horizontal plane at the same z-axis position.

Factor (d') refers to whether the current node 700 is located in the top half or bottom half of the parent node 702 (in the case of horizontal planarity). Because the parent is likely planar due to eligibility requirements, if the current node 700 is planar, then the plane position is slightly more likely to be at the "outside" of the parent node 702 and not towards the middle. Accordingly, the position of the current node 700 in its parent node 702 has a noticeable impact on the probability of the plane position within that current node 900.

In an implementation combining all four factors, there may be 2×3×2×2=24 predictive combinations in a case where the closest occupied already-coded node 706 at the same z and the depth (as the current node 700) is planar; otherwise, when the closest already-coded node 706 at the same z and the same depth is not planar, a specific context is used instead. Thus, 24+1=25 contexts may be used by the binary arithmetic coder to code the plane position flag in such an example.

Although the above examples refer to three factors for context determination in the case of the planar mode flag and four factors for context determination in the case of the plane position flag, it will be appreciated that the present application includes use of individual factors for context determination and all combinations and sub-combination of such factors.

Figure 8:
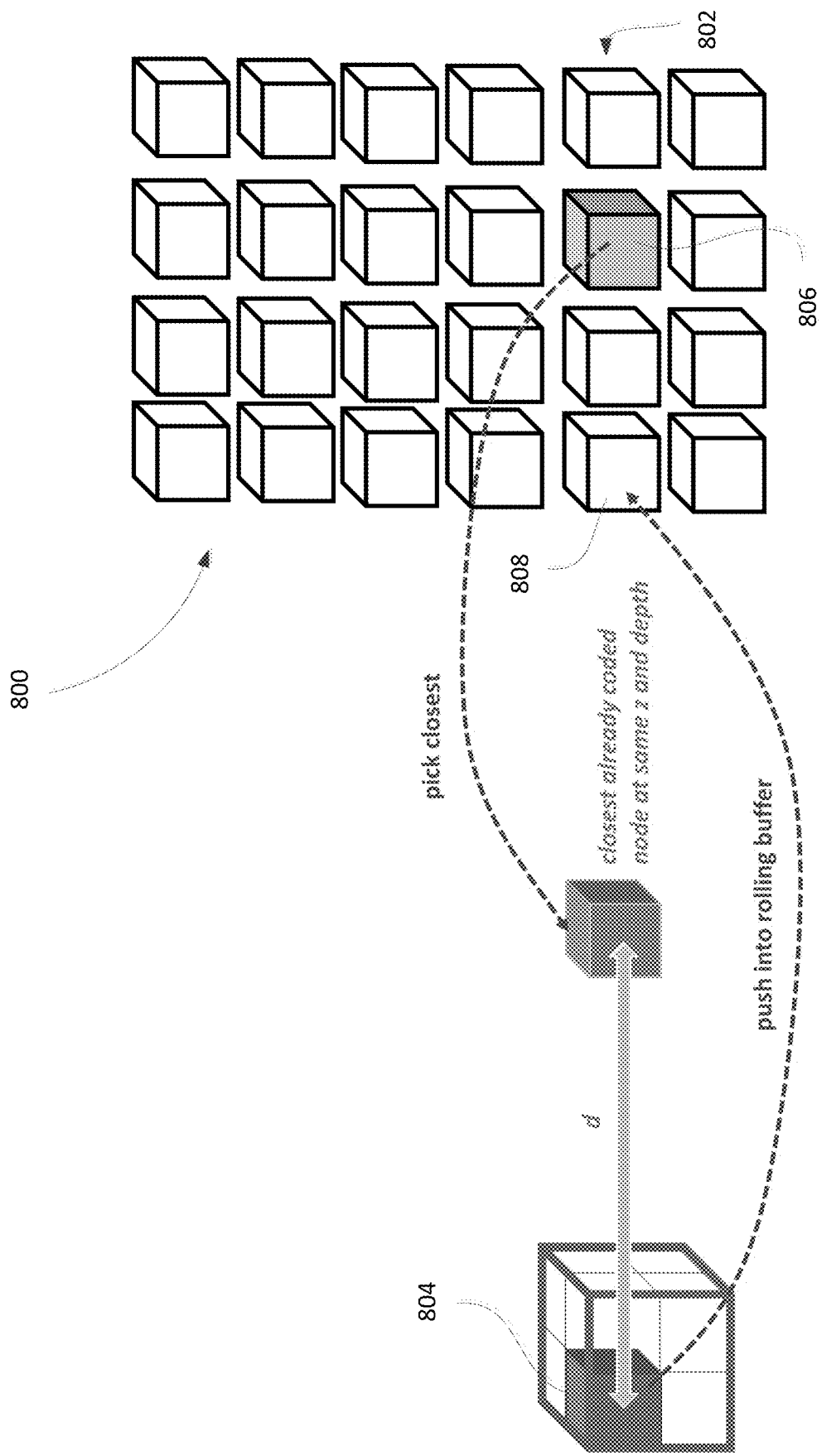
FIG. 8 shows one example mechanisms for tracking a closest already-coded occupied node at the same depth and in a common plane.

Reference is now made to FIG. 8, which diagrammatically illustrates one example implementation of a mechanism for managing the determination of a closest occupied already-coded node during the context determination process. In this example mechanism, the coding device uses a memory, e.g. a volatile or persistent memory unit, to implement a data structure that contains information regarding occupied already-coded nodes. In the example of FIG. 8, the data structure is a buffer 800. The buffer 800 allocates space to track already-coded nodes having the same z-axis location (for planar mode in the z-direction; x- or y-axis as appropriate for planar mode in other directions) and depth in the tree. The buffer 800 tracks information relating to up to four already-coded nodes having the same z-axis position and depth.

More generally, node data for one or more already-coded occupied nodes may be tracked using a data structure in memory. As in the example of FIG. 8, the data structure may, in some embodiments, be a two-dimensional array (e.g. the term "buffer grid" will be used hereafter to refer to such two-dimensional array) containing array elements which are organized into one or more rows and columns. The array elements of the array may each be associated with a respective already-coded occupied node.

Each row of the example buffer 800 corresponds to a z-axis position and depth. In particular, the buffer elements of a row are associated with tracked nodes that have a same position on the z-axis. The four columns correspond to four recently-coded occupied nodes having that z-axis position. For example, an example row 802 contains data relating to four already-coded occupied nodes. The stored data for each already-coded node may include the x and y position of the already-coded occupied node, whether the node was planar and, if so, the plane position.

In the course of coding a current node 804, a coding device accesses the buffer 800 to identify a closest occupied already-coded node from among the four stored nodes in the example row 802, based on the example row 802 being for the same z-axis position as the current node 804. As discussed above, the distance metric may be based on an L1 norm, an L2 norm, or any other measure of distance. The stored x and y positions for each node in the buffer 800 assist in making the determination of the closest node straightforward, particularly in the case of an L1 norm.

Once the closest node is identified, such as closest node 806, its distance from the current node 804 and perhaps its planarity and/or plane position are used in the context determination(s). The buffer 800 is then updated by adding the current node 804 to a first position 808 of the buffer 800 and right shifting all the other node data in that example row 802 of the buffer 800, causing the last item in the buffer 800 to be discarded. In some examples, based on the distance determination it may be that the identified closest node retains higher potential relevance to current coding. Prior to adding the current node 804 to the buffer 800, the contents of the example row 802 may first be rearranged so as to move the closest node 806 to the first position 808 and shifting nodes to the right to accommodate, e.g. in this example, the node data in the first position 808 and a second position are shifted to the second position and third position, respectively. In this manner, the coding device avoids expelling the mostly-recently identified closest node from the buffer 800 prematurely.

As illustrated in FIG. 8, the buffer 800 is in the form of a buffer grid. The buffer 800 includes numZ buffer rows (representing the number of possible z-axis positions and numBElts buffer elements per buffer row (i.e. number of columns of buffer 800). The total size of the buffer 800 is then proportional to numZ and is equal to numBElts× sizeBElt×numZ, where sizeBElt represents size of memory per element.

In some implementations, each buffer element may contain two 32-bit integers for storing x and y positions of the buffered node, two additional bits to indicate if the buffer element is empty (e.g. not yet used), and to store the isZPlanar flag information and the plane position flag information. For example, 0b11 may indicate buffer element is not yet used; 0b10 may indicate node is not planar; 0b01 may indicate node is planar and plane position flag is 1; and 0b00 may indicate node is planar and plane position flag is 0; with 0bXY indicating the value of the two bits X and Y. In total, 66 bits would be needed per buffer element. With an implementation using 4 bytes memory alignment, this means that 96 bits (i.e. sizeBElt=12 bytes) per buffer element are used. FIG. 8 provides an example of a buffer for planar mode in the z-direction; similar buffers can be derived for x- (with numX buffer rows, and storing isXPlanar flag information and plane position flag information) or y-axis (with numY buffer rows, and storing isYPlanar flag information and plane position flag information) as appropriate for planar mode in other directions. When a buffer is used for each one of x-, y-, and z-directions, the total memory allocation for buffering planar mode information may be approximately equal to numBElts×sizeBElt×(numZ+numY+numX).

The context modelling for entropy coding of planar mode syntax elements may use buffers that have a significant memory footprint. For example, if a point cloud to be compressed is contained in a large 3D volume, a suitable buffer grid may require a substantial amount of memory. It is desirable to minimize the memory required by planar mode while retaining its compression efficiency.

Figure 9:
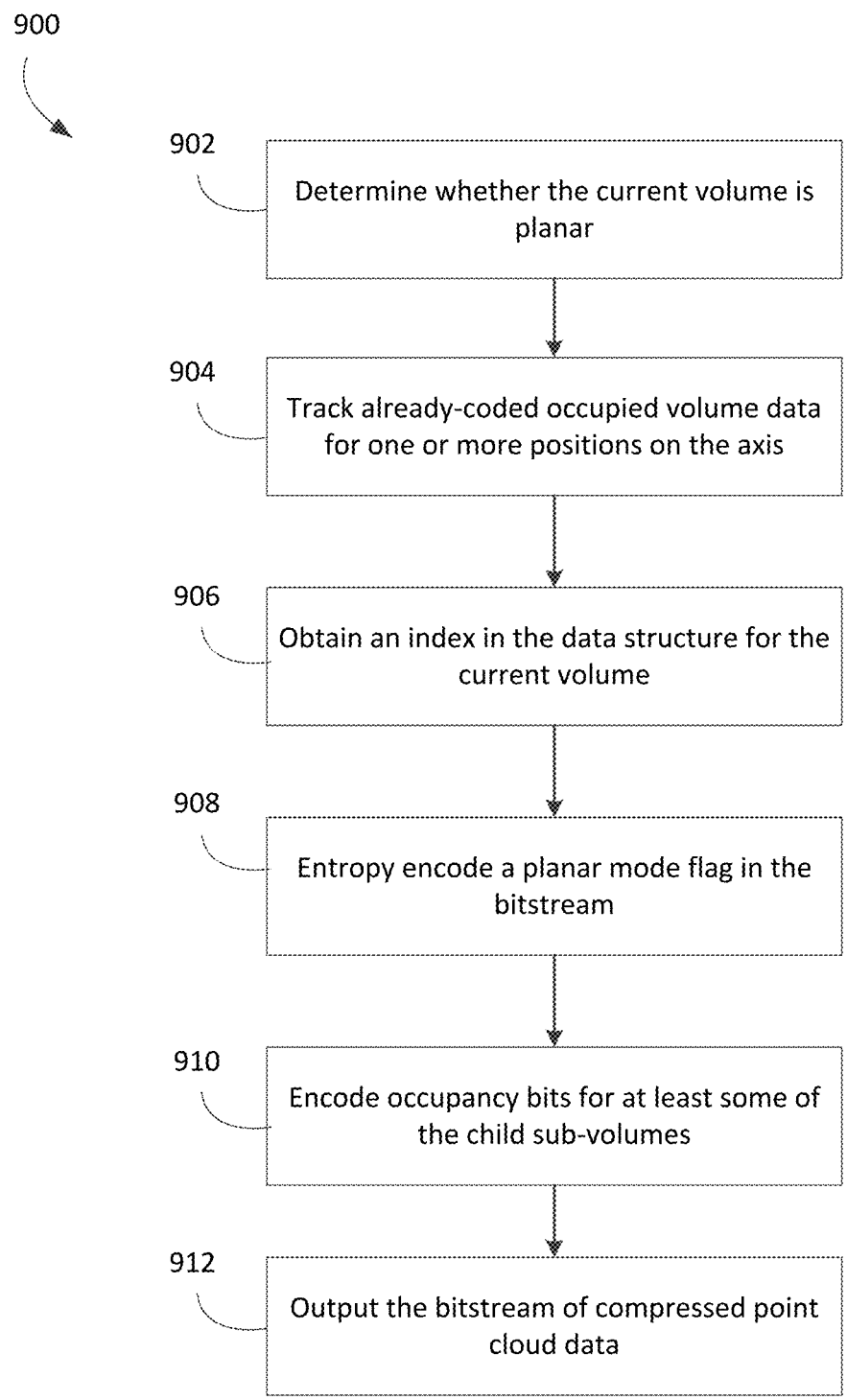
FIG. 9 shows, in flowchart form, an example solution for minimizing memory requirements of planar coding mode as implemented in an encoder.

FIG. 9 illustrates an example solution for minimizing memory requirements of planar coding mode as implemented in an encoder. Specifically, FIG. 9 shows, in flowchart form, an example method 900 for encoding a point cloud. In the implementation of FIG. 9, it is proposed to use a reduced-size data structure for tracking node data for one or more already-coded nodes. The method 900 may be implemented, at least in part, by an encoder, such as the example encoder 1300 illustrated in FIG. 13.

In operation 902, it is determined whether the current node is planar. The determination is based on whether all child sub-volumes containing at least one point are positioned in a first set of child sub-volumes in a first plane or a second set of child sub-volumes in a second plane parallel to the first plane.

Node data for one or more already-coded occupied nodes is tracked and stored in a data structure (e.g. a buffer) in memory. Specifically, node data is maintained for occupied nodes having different values of z-axis position (for planar mode in the z-direction; x- or y-axis position as appropriate for planar mode in other directions). In accordance with embodiments of the present disclosure, the data structure is used for tracking node data associated with already-coded occupied nodes such that one or both of an index in the data structure or a representative position data for at least one already-coded occupied node with a given index in the data structure is obtained based on applying a hash function to coordinates data for a current or an already-coded node. A node's coordinates data refers to data representing at least one of x-, y- or z-axis positions of the node.

In operation 904, volume data for at least one already-coded occupied node is stored in the data structure. The index in the data structure and/or representative position data for the at least one already-coded occupied node is determined based on applying a hash function to coordinates data for said at least one already-coded occupied node. In this way, volume data for a plurality of already-coded occupied nodes may be tracked. As will be explained below, this tracked node data can be used for context determination in entropy coding planar mode flags for subsequently processed nodes during compression of point cloud data.

In cases where the index in the data structure or representative position data for an already-coded occupied node with a given index in the data structure is not obtained based on applying a hash function, such information may be directly derived from the node's axis position(s). For example, the index in the data structure may be the z-axis position (for planar mode in the z-direction; x- or y-axis position as appropriate for planar mode in other directions) of the node, or the representative position data may be x- and y-axis positions (for planar mode in the z-direction; y- and z- or x- and z-axis positions as appropriate for planar mode in other directions) of the node.

In operation 906, an index in the data structure for the current node is determined. In particular, a hash function is applied to coordinates data for the current node to determine an index associated with the current node within the data structure. Examples of suitable hash functions which may be applied in operation 906 are described below with reference to FIG. 10. In addition to determining the index associated with the current node, representative position data may be obtained for the current node, based on applying the hash function to coordinates data for the current node.

In operation 908, a planar mode flag for the current node is entropy encoded in the bitstream to signal whether the current node is planar. The entropy encoding includes determining a context for coding the planar mode flag based on, at least, a distance between the current volume and a closest already-coded occupied node from among the tracked nodes that have the same index in the data structure as the current node. In at least some embodiments, the distance is computed based on representative position data obtained for the current node and representative position data obtained for the tracked nodes. That is, the closest already-coded occupied node is selected from only the tracked nodes whose node data is stored in the data structure.

In at least some embodiments, the data structure may be updated based on node data for the current node. In particular, node data for already-coded occupied nodes that is tracked via the data structure may be updated. After a closest already-coded occupied node associated with a currently processed node is identified, node data for said current node may be stored in the data structure. Specifically, node data, including representative position data, associated with the current node may be stored in the data structure as a new tracked node at the index, obtained in operation 906, for the current node. In some embodiments, the node data for the current node may replace stored node data for one of the tracked nodes having the same index as the current node. For example, the data structure may be updated in a similar manner as operation 808 of method 800, to discard one of the tracked nodes from the data structure when node data for the current node is added to the data structure.

In operation 910, occupancy bits for at least some of the child nodes (sub-volumes) are encoded, and the bitstream of compressed point cloud data is output, in operation 912.

Figure 10:
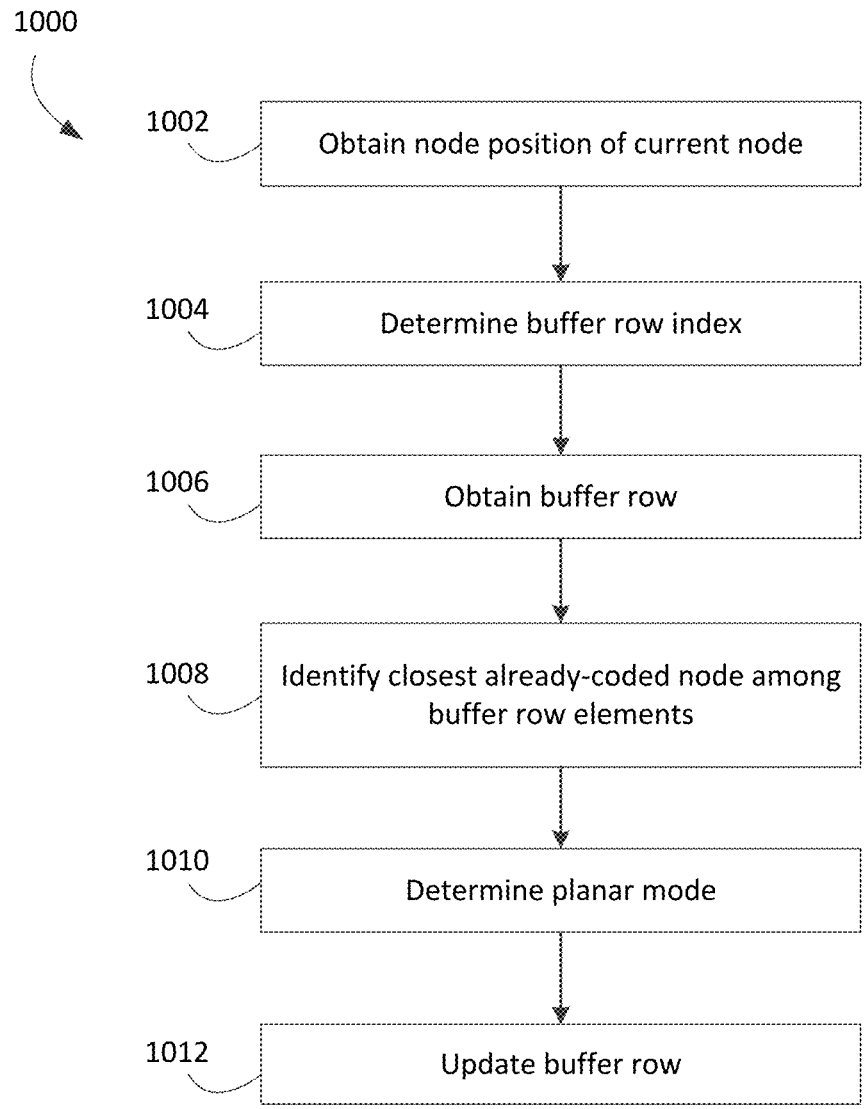
FIG. 10 shows, in flowchart form, one example method for tracking node data for already-coded occupied nodes in coding using the planar mode.

Reference is now made to FIG. 10, which shows, in flowchart form, an example method 1000 for tracking node data for already-coded occupied nodes in coding using the planar mode. In at least some embodiments, operations of method 1000 may be performed as sub-operations of method 900 described above. The method 1000 is described in connection with a reduced-size buffer grid containing buffer elements associated with already-coded nodes, but it will be understood that the method is applicable with other types of data structures which may be maintained during planar mode coding. For example, instead of a buffer grid, a binary search tree or a hash table could be used as well to store the tracked nodes data according to the obtained index in the data structure.

It should be noted that using a data structure to store tracked nodes data according to the obtained index in the data structure, when the index is obtained by applying a hash function to the position on the z-axis, is different from using a hash table to store the tracked nodes data according to position on the z-axis directly. In the latter, even if position on the z-axis is hashed to find a position in the data storage structure, no memory savings may be obtained in a worst-case scenario. Tracked nodes will continue to be associated with each possible position on the z-axis. A hash table has specific handling when hash collision occurs, so that no position on the z-axis is lost. In contrast, in the embodiments described in the present disclosure, hash collisions facilitate memory reduction, by allowing several different positions on the z-axis to share a same hash value, and intentionally share a common memory space, as if they had the same position on the z-axis.

Figure 11:
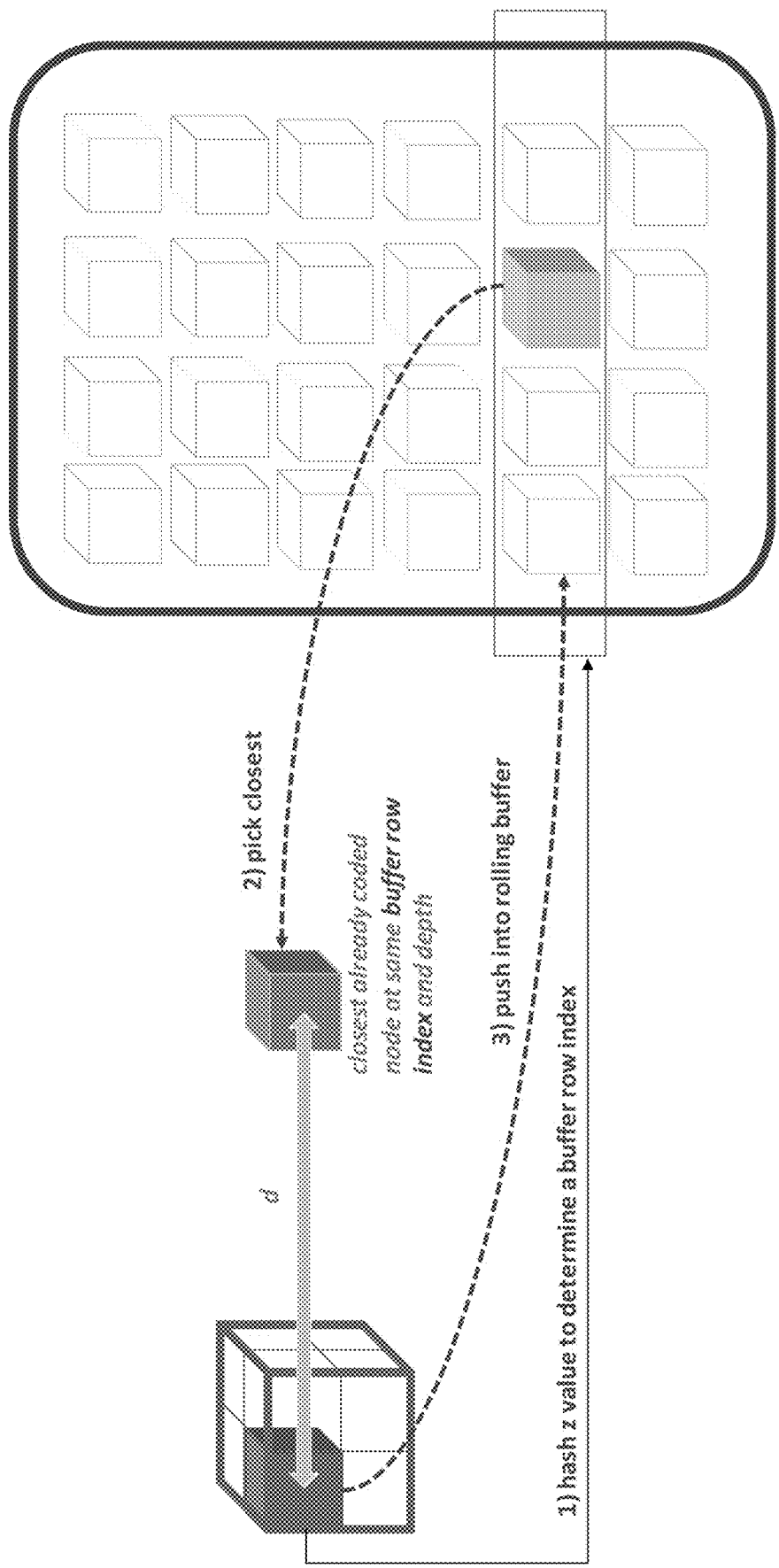
FIG. 11 shows one example diagrammatically illustrating the operations of method illustrated in FIG. 10.

FIG. 11 diagrammatically illustrates the operations of method 1000. In operation 1002, a node position for a currently processed node is obtained. In particular, position coordinates (x-, y- and z-values) for the current node may be obtained. The node position may be the position of the current node with precision relative to the current tree depth (i.e. the precision and number of bits of x-, y-, and z-values depend on the depth in the tree).

In operation 1004, a buffer row index for the current node is determined. In some embodiments, the buffer row index may be determined by applying a hash function to the z-value (for planar mode in the z-direction; x- or y-value as appropriate for planar mode in other directions) of the current node. For an efficient planar mode entropy coding, the hash function should distribute the z-values between buffer rows such that nodes with different z-values but with close coding order are not likely to be assigned to a same buffer row.

A number of different hash functions may be suitable for applying in operation 1004. To enable memory reduction, it will be understood that the hash function is a surjective function and is not bijective. The lower is the cardinality of the destination space (codomain of the function), the higher can be the memory reduction. If the reduced size buffer grid contains $N_{rows}=2^N$ rows, a suitable hash function may be a function which keeps the lowest N bits of the z-value. A fast implementation may be obtained by using a simple mask, $$\text{rowIdx}=\text{hash}(z)=z \,\&\, ((1<<N)-1)$$

where "&" stands for the binary AND operator and "<<" for the left bit-shift operator.

Another hash function may add the highest bits of the z-value to (or alternatively XOR-ed with) the lowest bits, which introduces more randomness in the buffer row selection:

rowIdx=(z&((1<<N)−1))^((z>>N)&((1<<N)−1)), here "^" stands for the binary XOR operator, or equivalently rowIdx=(z^(z>>N))&((1<<N)−1).

Other methods could be used to randomize the output index of the hash function for subsequent z-values.

If the reduced size buffer grid contains a number of rows Nrows that is not a power of 2, simple masking may not be suitable. Instead, a modulo operation may be performed rowIdx=z mod Nrows, or rowIdx=f(z)mod Nrows, where $f$ is a function used to introduce randomness. For example, the function $f$ may be:
- one of the hash functions previously described for the case where the number or rows is a power of 2,
- a triangle wave function,
- a sawtooth function, or
- any other more sophisticated function (e.g. a sinusoidal function) or a random number generator.

In operation 1006, the buffer row corresponding to the determined buffer row index is identified. The encoder uses the buffer row index information to find a closest already-coded node. As nodes having different z-values may be present in a same buffer row, determining the closest already-coded node requires some adaptation. Closest nodes are determined based on a distance from the current node.

In some embodiments, the z-value may be ignored when determining a closest already-coded node. The distance to an already-coded node in the buffer may then be determined in the xy-plane only (for planar mode in the z-direction; yz- or xz-plane as appropriate for planar mode in other directions), without regard to the z-value of the current node. In some other embodiments, the z-value may be used when determining the closest already-coded node. Those nodes having a different z-value than the current node may be discarded as potential closest node candidates. Data representing the z-value may thus be stored in the buffer elements associated with already-coded nodes. Instead of directly storing a z-value in entirety in the buffer elements, information which may allow for deducing the z-value may be stored. For example, if the hash function that is used in operation 1004 is such that it keeps the lowest bits of the z-value, the data that is stored in the buffer elements may be the highest bits of the z-value.

The identified buffer row is then used in operation 1008 to find a closest already-coded node. If the buffer row is empty or if the buffer row does not contain a node with the same z-value as the current node, no closest node may be identified. In such cases, the coding context used to code the plane position flag may be the same as if there was a closest node and if its planar mode flag was 0.

In operation 1010, the planar mode is applied for coding information associated with the occupancy child nodes of the current node. In an encoder, the planar mode is determined based on the point cloud data, and the planar mode and (optionally) plane position flags are encoded in the bitstream using entropy coding contexts that are selected based on the result of the search for the closest already-coded node. In a decoder, the planar mode is determined based on the planar mode and (optionally) plane position flags decoded from the bitstream using the same entropy coding contexts selected based on the same result of the search for the closest already-coded node.

In operation 1012, the buffer row is updated. In particular, node data for the current node is pushed into the buffer row to replace a previously coded node.

For further memory savings, in some embodiments, the node data that is to be stored in the buffer (i.e. buffer elements) may be obtained via use of a hash function. Each element of a buffer row typically contains (in the case of planar coding in the z-direction) the x- and y-values to indicate the previously coded node position and additional information such as, for example, an isEmpty flag to indicate if there is a node in the buffer element or if the buffer element is empty (e.g. not yet used), a planar mode flag isZPlanar (in the case of planar coding in the z-direction) and a plane position flag associated with the previously coded node, and z-position or information allowing to deduce the z-position. The amount of memory to be allocated to a buffer may be reduced by reducing an amount of memory required to store each buffer element.

In some embodiments, a hash function may be applied to the x- and y-coordinates of a previously coded node position to reduce the number of bits required to store this information in the buffer. The distance, d, from a currently processed node to tracked previously coded nodes may then be computed using a metric in the hashed space (i.e. the distance d is computed using the result of the hash function applied to the x- and y-coordinates of a previously coded node position, which is stored in the buffer, and the result of the hash function applied to the x- and y-coordinates of the currently processed node).

A hash function that is suitable for use in this embodiment is a function which returns a fixed number (e.g. 3, 4, 7, 8, 15 or 16) of the lowest bits of the x- and y-values. The distance d is then computed using hashed x- and y-values for both the current node and the closest previously coded nodes.

Another suitable hash function (that can be applied to both x- and y-values) is the function that discards a fixed number M of lowest bits of its parameter u and keeps a fixed number N of the next lowest bits, e.g.:

hashX(u)=(u>>M)&((1<<N)−1)=(u&(((1<<N)−1)<<M))>>M.

Discarding lowest bit(s) has advantage of removing information that is not useful with the later use of distance d. For example, d may be discretized into three categories "near", "not too far", and "far". Typically, "near" is for d≤2, "not too far" for 2<d≤16, and "far" for d>16. With any N>1 and with M chosen as being equal to 1, i) if d is being computed as the distance between the double of hashX( ) outputs for x- and y-values, or ii) if d is being computed as the double of the distance between the hashX( ) outputs for x- and y-values, or iii) if d is being computed as the distance between the hashX( ) outputs for x- and y-values and category "near" is set for d≤1, "not too far" for 1<d≤8, and "far" for d>8, then the coding of the planar mode information is the same as if M was chosen equal to 0 and N was chosen equal to N+1. Thus, one further bit can be removed for storing x- and y-values without affecting compression efficiency. Typical values for M and N are then M=1 and N equal to one of 3, 4, 7, 8, 15 or 16.

A further means for reducing memory size of a buffer grid is to reduce the number numBElts of elements per buffer row. In particular, a maximum number of elements per row may be imposed for the buffer grid. For example, maximum memory gain may be obtained when numBElts=1. In this case, the context is determined based on the last already-coded node at same z-position and same depth and no closest node search is required to be conducted. This has the advantage of simplifying the planar mode algorithm by reducing the amount of operations and memory accesses.

Any combination of the three above described solutions for minimizing memory requirements for the buffer grid may be performed in planar mode coding. It will be appreciated that the described buffer is one example implementation of a mechanism for managing data regarding the closest node, but that the present application is not necessarily limited to this example and various other mechanisms (e.g. other data structures) for tracking closest node information may be used. Moreover, it will be appreciated that retaining only a fixed number of recently-coded occupied nodes in the buffer means that there is a chance that the identified node is not actually the closest occupied already-coded node but merely the closest already-coded node available from the buffer; however, even when the buffer is limited to four (or even one) candidates, as in the examples above, the impact on performance is negligible.

Figure 13:
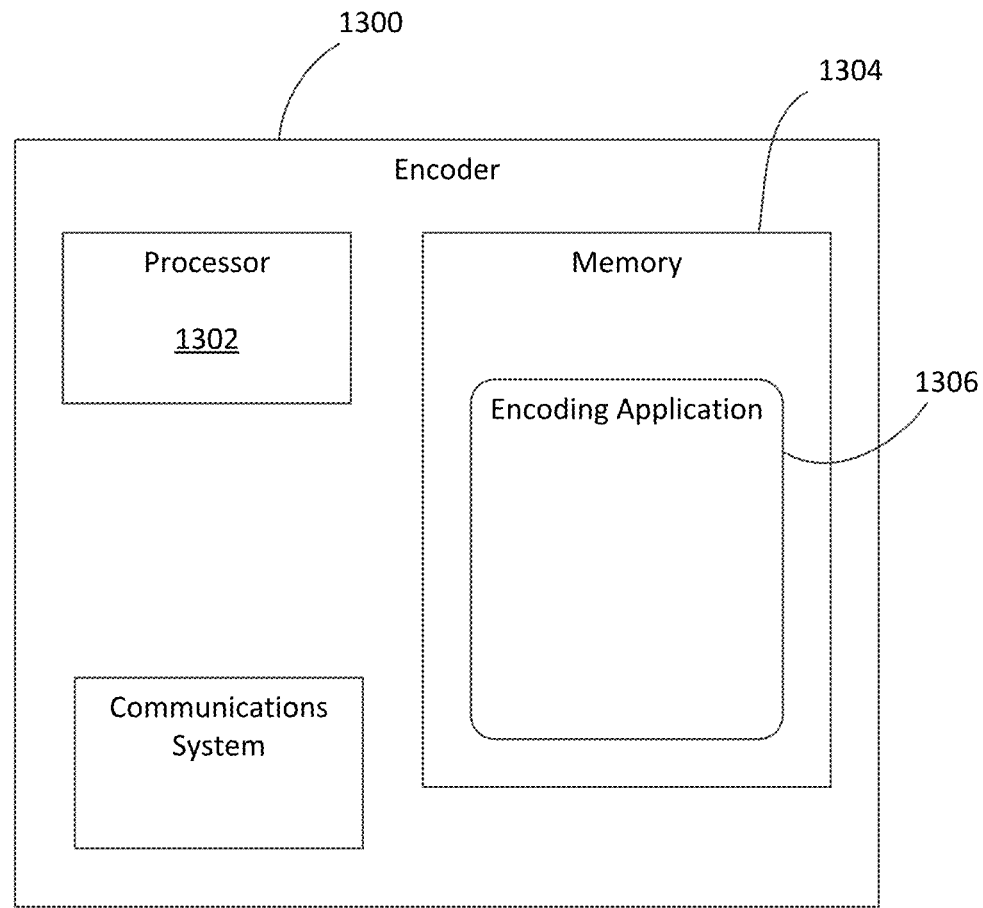
FIG. 13 shows an example simplified block diagram of an encoder.

Reference is made to FIG. 13, which shows a simplified block diagram of an example embodiment of an encoder 1300. The encoder 1300 includes a processor 1302, memory 1304, and an encoding application 1306. The encoding application 1306 may include a computer program or application stored in memory 1304 and containing instructions that, when executed, cause the processor 1302 to perform operations such as those described herein. For example, the encoding application 1306 may encode and output bitstreams encoded in accordance with the processes described herein. It will be understood that the encoding application 1306 may be stored on a non-transitory computer-readable medium, such as a compact disc, flash memory device, random access memory, hard drive, etc. When the instructions are executed, the processor 1302 carries out the operations and functions specified in the instructions so as to operate as a special-purpose processor that implements the described process(es). Such a processor may be referred to as a "processor circuit" or "processor circuitry" in some examples.

Figure 12:
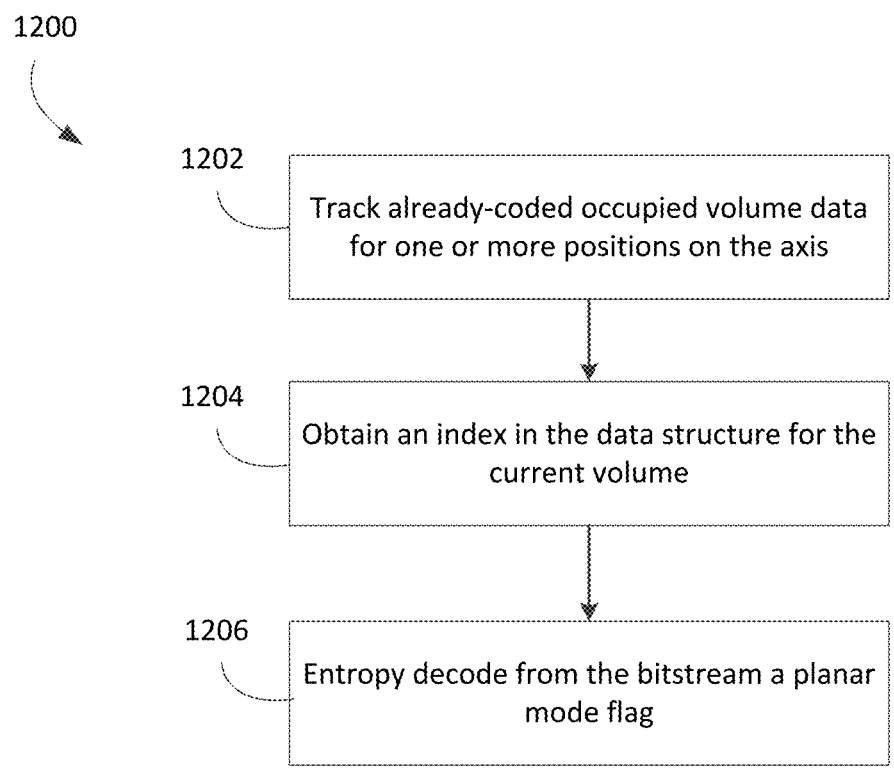
FIG. 12 illustrates an example solution for minimizing memory requirements of planar coding mode as implemented in a decoder corresponding to an encoder as in FIG. 9.

FIG. 12 illustrates an example solution for minimizing memory requirements of planar coding mode as implemented in a decoder. Specifically, FIG. 12 shows, in flowchart form, an example method 1200 for decoding a point cloud from a bitstream. The implementation of FIG. 12 represents a decoder corresponding to the encoder example illustrated in FIG. 9. The method 1200 may be implemented, at least in part, by a decoder, such as the example decoder 1400 illustrated in FIG. 14.

In operation 1202, node data for already-coded occupied nodes is tracked. In accordance with embodiments of the present disclosure, the same data structure as in FIG. 9 may be used for tracking node data for already-coded occupied nodes, such that one or both of an index in the data structure or representative position data for at least one already-coded occupied node with a given index in the data structure is obtained based on applying a hash function to the coordinates data for the already-coded node.

The points of the point cloud are reconstructed by reconstructing the occupancy bits for at least some of the child nodes of the current node. In operation 1204, an index in the data structure for the current node is obtained. In at least some embodiments, the index may be obtained by applying a hash function to coordinates data associated with the current node. Specifically, from the current node position on the z-axis (for planar mode in the z-direction; x- or y-axis position as appropriate for planar mode in other directions), an index in the data structure is determined. Additionally, from the current node positions on x- and y-axis (for planar mode in the z-direction; y- and z- or x and z-axis position as appropriate for planar mode in other directions), representative position data for the current node may be obtained. This operation corresponds to operation 904 of method 900.

In operation 1206, the planar mode flag for the current node is entropy decoded from the bitstream and indicates whether the current node is planar in the considered axis direction. The entropy decoding includes determining a context for decoding the planar mode flag based on, at least, a distance between the current node and a closest already-coded occupied node from among the tracked nodes that have the same index in the data structure as the current node. The distance may be computed based on the representative position data obtained for the current node and representative position data for one or more tracked nodes that is maintained in the data structure. The closest already-coded occupied node is selected from only the tracked nodes whose node data is stored in the data structure, as is the case for the encoder in FIG. 9.

Figure 14:
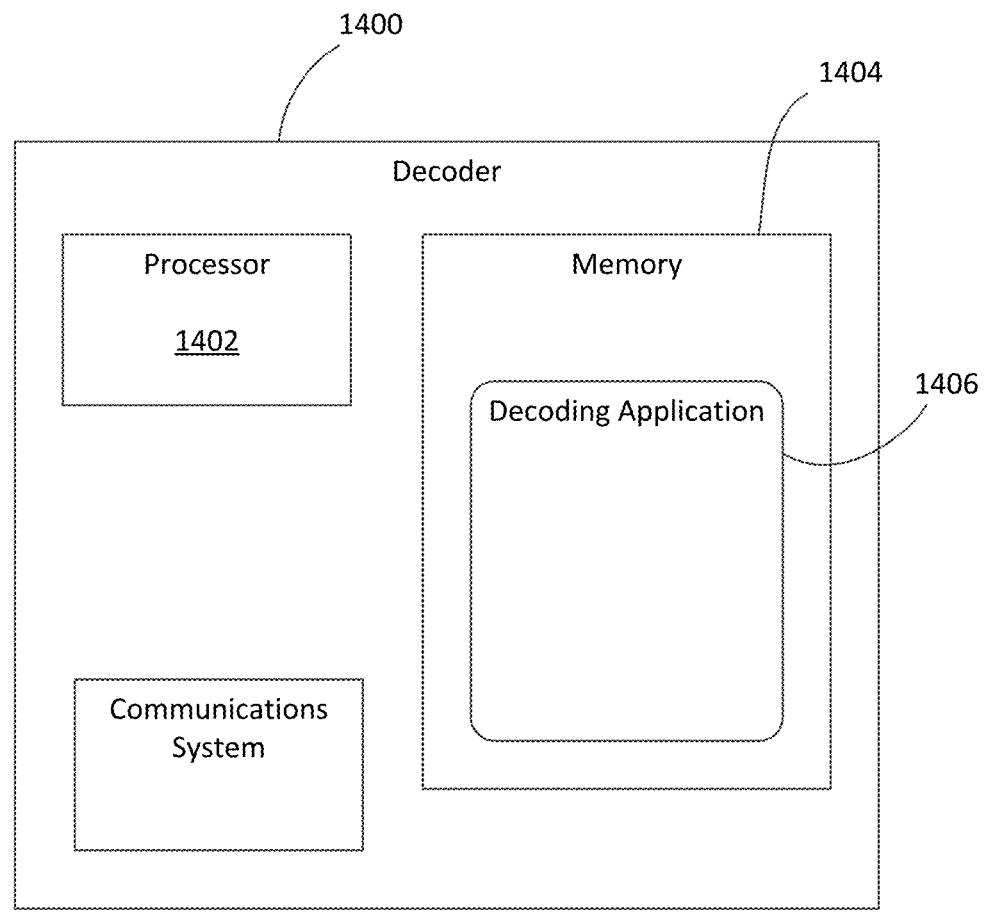
FIG. 14 shows an example simplified block diagram of a decoder.

Reference is now also made to FIG. 14, which shows a simplified block diagram of an example embodiment of a decoder 1400. The decoder 1400 includes a processor 1402, a memory 1404, and a decoding application 1406. The decoding application 1406 may include a computer program or application stored in memory 1404 and containing instructions that, when executed, cause the processor 1402 to perform operations such as those described herein. It will be understood that the decoding application 1406 may be stored on a computer-readable medium, such as a compact disc, flash memory device, random access memory, hard drive, etc. When the instructions are executed, the processor 1402 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive.

The invention claimed is:

1. A method of encoding a point cloud to generate a bitstream of compressed point cloud data representing a three-dimensional location of an object, the point cloud being located within a volumetric space recursively split into sub-volumes and containing points of the point cloud, wherein a current volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis, the method comprising:

determining whether the current volume is planar based on whether all child sub-volumes containing at least one point are positioned in either the first set or the second set;

tracking already-encoded occupied volume data for one or more positions on the axis, wherein the tracking includes storing, in a data structure, volume data for at least one already-encoded occupied volume, wherein one or both of an index in the data structure and representative position data for the at least one already-encoded occupied volume is obtained based on applying a hash function to coordinates data for said at least one already-encoded occupied volume;

obtaining an index in the data structure for the current volume based on applying the hash function to coordinates data for the current volume;

entropy encoding in the bitstream a planar mode flag to signal whether the current volume is planar, wherein the entropy encoding includes determining a context for coding the planar mode flag based on a distance between the current volume and a closest already-encoded occupied volume among those tracked already-encoded occupied volumes that have a same index in the data structure as the current volume;

encoding occupancy bits for at least some of the child sub-volumes; and outputting the bitstream of compressed point cloud data.

2. The method of claim 1, wherein the data structure comprises a two-dimensional array, each array element of the array being associated with a respective already-encoded occupied volume, wherein each row of the array contains array elements corresponding to tracked volumes that have a same index in the data structure.

3. The method of claim 2, wherein a row index of an already-encoded occupied volume in the array is obtained based on applying a hash function to a coordinate representing a position of the already-encoded occupied volume on the axis.

4. The method of claim 1, wherein the closest already-encoded occupied volume is identified based on determining distances between the current volume and each of the tracked already-encoded occupied volumes having the same index in the data structure as the current volume.

5. The method of claim 4, wherein the distances are determined using coordinates in a plane orthogonal to the axis.

6. The method of claim 1, wherein the stored volume data for the at least one already-encoded occupied volume comprises hashes of coordinates representing a position of the at least one already-encoded occupied volume in a plane orthogonal to the axis.

7. The method of claim 6, wherein the stored volume data for the at least one already-encoded occupied volume includes one or more of a planar mode flag associated with the at least one already-encoded occupied volume or a position of the at least one already-encoded occupied volume on the axis.

8. The method of claim 1, further comprising updating already-encoded occupied volume data for the tracked volumes having the same index in the data structure as the current volume.

9. The method of claim 8, wherein the updating comprises discarding stored volume data for one of the tracked volumes having the same index as the current volume from the data structure and adding volume data for the current volume to the data structure.

10. The method of claim 9, wherein the updating comprises:

obtaining representative position data for the current volume, wherein one or both of the index in the data structure and the representative position data for the current volume is obtained based on applying a hash function to coordinates data for the current volume; and storing, at the obtained index in the data structure, volume data for the current volume, the volume data including the representative position data for the current volume.

11. A method of decoding a bitstream of compressed point cloud data to produce a reconstructed point cloud representing a three-dimensional location of a physical object, the point cloud being located within a volumetric space recursively split into sub-volumes and containing points of the point cloud, wherein a current volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis, the method comprising:

tracking already-decoded occupied volume data for one or more positions on the axis, wherein the tracking includes storing, in a data structure, volume data for at least one already-decoded occupied volume, wherein one or both of an index in the data structure and representative position data for the at least one already-decoded occupied volume is obtained based on applying a hash function to coordinates data for said at least one already-decoded occupied volume;

reconstructing the points of the point cloud by reconstructing the occupancy bits by:

obtaining an index in the data structure for the current volume based on applying the hash function to coordinates data for the current volume;

entropy decoding from the bitstream a planar mode flag that indicates whether the current volume is planar, wherein the current volume is planar if all child sub-volumes containing at least one point are positioned in either the first set or the second set, wherein entropy decoding includes determining a context for coding the planar mode flag based on a distance between the current volume and a closest already-decoded occupied volume among those tracked already-decoded occupied volumes that have a same index in the data structure as the current volume; and reconstructing occupancy bits for the child sub-volumes.

12. The method of claim 11, wherein the data structure comprises a two-dimensional array, each array element of the array being associated with a respective already-decoded occupied volume, wherein each row of the array contains array elements corresponding to tracked volumes that have a same index in the data structure.

13. The method of claim 12, wherein a row index of an already-decoded occupied volume in the array is obtained based on applying a hash function to a coordinate representing a position of the already-decoded occupied volume on the axis.

14. The method of claim 11, wherein the closest already-decoded occupied volume is identified based on determining distances between the current volume and each of the tracked already-decoded occupied volumes having the same index in the data structure as the current volume.

15. The method of claim 14, wherein the distances are determined using coordinates in a plane orthogonal to the axis.

16. The method of claim 11, wherein the stored volume data for the at least one already-decoded occupied volume comprises hashes of coordinates representing a position of the at least one already-decoded occupied volume in a plane orthogonal to the axis.

17. The method of claim 16, wherein the stored volume data for the at least one already-decoded occupied volume includes one or more of a planar mode flag associated with the at least one already-decoded occupied volume or a position of the at least one already-decoded occupied volume on the axis.

18. The method of claim 11, further comprising updating already-decoded occupied volume data for the tracked volumes having the same index in the data structure as the current volume.

19. The method claimed in claim 18, wherein the updating comprises discarding stored volume data for one of the tracked volumes having the same index as the current volume from the data structure and adding volume data for the current volume to the data structure.

20. The method of claim 19, wherein the updating comprises:
obtaining representative position data for the current volume, wherein one or both of the index in the data structure and the representative position data for the current volume is obtained based on applying a hash function to coordinates data for the current volume; and
storing, at the obtained index in the data structure, volume data for the current volume, the volume data including the representative position data for the current volume.

21. An encoder for encoding a point cloud to generate a bitstream of compressed point cloud data representing a three-dimensional location of an object, the point cloud being located within a volumetric space recursively split into sub-volumes and containing points of the point cloud, wherein a volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis, the encoder comprising:
a processor;
memory; and
an encoding application containing instructions executable by the processor that, when executed, cause the processor to:
determine whether the current volume is planar based on whether all child sub-volumes containing at least one point are positioned in either the first set or the second set;
track already-encoded occupied volume data for one or more positions on the axis, wherein the tracking includes storing, in a data structure, volume data for at least one already-encoded occupied volume, wherein one or both of an index in the data structure and representative position data for the at least one already-encoded occupied volume is obtained based on applying a hash function to coordinates data for said at least one already-encoded occupied volume;
obtain an index in the data structure for the current volume based on applying the hash function to coordinates data for the current volume;
entropy encode in the bitstream a planar mode flag to signal whether the current volume is planar, wherein the entropy encoding includes determining a context for coding the planar mode flag based on a distance between the current volume and a closest already-encoded occupied volume among those tracked already-encoded occupied volumes that have a same index in the data structure as the current volume;
encode occupancy bits for at least some of the child sub-volumes; and
output the bitstream of compressed point cloud data.

22. A decoder for decoding a bitstream of compressed point cloud data to produce a reconstructed point cloud representing a three-dimensional location of a physical object, the point cloud being located within a volumetric space recursively split into sub-volumes and containing points of the point cloud, wherein a current volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis, the decoder comprising:
a processor;
memory; and
a decoding application containing instructions executable by the processor that, when executed, cause the processor to:
track already-decoded occupied volume data for one or more positions on the axis, wherein the tracking includes storing, in a data structure, volume data for at least one already-decoded occupied volume, wherein one or both of an index in the data structure and representative position data for the at least one already-decoded occupied volume is obtained based on applying a hash function to coordinates data for said at least one already-decoded occupied volume;
reconstruct the points of the point cloud by reconstructing the occupancy bits by:

obtain an index in the data structure for the current volume based on applying the hash function to coordinates data for the current volume;

entropy decode from the bitstream a planar mode flag that indicates whether the current volume is planar, wherein the current volume is planar if all child sub-volumes containing at least one point are positioned in either the first set or the second set, wherein entropy decoding includes determining a context for coding the planar mode flag based on a distance between the current volume and a closest already-decoded occupied volume among those tracked already-decoded occupied volumes that have a same index in the data structure as the current volume; and reconstructing occupancy bits for the child sub-volumes.

23. A non-transitory processor-readable medium storing processor-executable instructions to encode a point cloud to generate a bitstream of compressed point cloud data representing a three-dimensional location of an object, the point cloud being located within a volumetric space recursively split into sub-volumes and containing points of the point cloud, wherein a current volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis, wherein the processor-executable instructions, when executed by a processor, are to cause the processor to:

determine whether the current volume is planar based on whether all child sub-volumes containing at least one point are positioned in either the first set or the second set;

track already-encoded occupied volume data for one or more positions on the axis, wherein the tracking includes storing, in a data structure, volume data for at least one already-encoded occupied volume, wherein one or both of an index in the data structure and representative position data for the at least one already-encoded occupied volume is obtained based on applying a hash function to coordinates data for said at least one already-encoded occupied volume;

obtain an index in the data structure for the current volume based on applying the hash function to coordinates data for the current volume;

entropy encode in the bitstream a planar mode flag to signal whether the current volume is planar, wherein the entropy encoding includes determining a context for coding the planar mode flag based on a distance between the current volume and a closest already-encoded occupied volume among those tracked already-encoded occupied volumes that have a same index in the data structure as the current volume;

encode occupancy bits for at least some of the child sub-volumes; and output the bitstream of compressed point cloud data.

24. A non-transitory processor-readable medium storing processor-executable instructions to decode a bitstream of compressed point cloud data to produce a reconstructed point cloud representing a three-dimensional location of a physical object, the point cloud being located within a volumetric space recursively split into sub-volumes and containing points of the point cloud, wherein a current volume is partitioned into a first set of child sub-volumes and a second set of child sub-volumes, the first set of child sub-volumes being positioned in a first plane and the second set of child sub-volumes being positioned in a second plane parallel to the first plane, and wherein an occupancy bit associated with each respective child sub-volume indicates whether that respective child sub-volume contains at least one of the points, both the first plane and the second plane being orthogonal to an axis, wherein the processor-executable instructions, when executed by a processor, cause the processor to:

track already-decoded occupied volume data for one or more positions on the axis, wherein the tracking includes storing, in a data structure, volume data for at least one already-decoded occupied volume, wherein one or both of an index in the data structure and representative position data for the at least one already-decoded occupied volume is obtained based on applying a hash function to coordinates data for said at least one already-decoded occupied volume;

reconstruct the points of the point cloud by reconstructing the occupancy bits by:

obtain an index in the data structure for the current volume based on applying the hash function to coordinates data for the current volume;

entropy decode from the bitstream a planar mode flag that indicates whether the current volume is planar, wherein the current volume is planar if all child sub-volumes containing at least one point are positioned in either the first set or the second set, wherein entropy decoding includes determining a context for coding the planar mode flag based on a distance between the current volume and a closest already-decoded occupied volume among those tracked already-decoded occupied volumes that have a same index in the data structure as the current volume; and reconstructing occupancy bits for the child sub-volumes.

* * * * *